United States Patent [19]
Stern

[11] Patent Number: 6,085,121
[45] Date of Patent: Jul. 4, 2000

[54] DEVICE AND METHOD FOR RECOMMENDING DYNAMICALLY PREFERRED SPEEDS FOR MACHINING

[75] Inventor: Elliot L. Stern, Lutz, Fla.

[73] Assignee: Design & Manufacturing Solutions, Inc., Lutz, Fla.

[21] Appl. No.: 08/935,361

[22] Filed: Sep. 22, 1997

[51] Int. Cl.⁷ .............................. G06F 19/00; G08B 21/00
[52] U.S. Cl. ........................... 700/175; 700/174; 700/179; 700/177; 700/180; 340/680; 340/683
[58] Field of Search ........................ 364/474.16, 474.17, 364/474.19, 474.22, 474.24, 474.3, 528.15; 340/825.32, 680, 683; 702/56; 700/174, 177, 180, 182, 188, 280, 175, 179

[56] References Cited

U.S. PATENT DOCUMENTS

| | | | |
|---|---|---|---|
| 2,419,120 | 4/1947 | Clark | 408/16 |
| 3,550,107 | 12/1970 | Thompson et al. | 340/683 |
| 3,599,864 | 8/1971 | Liddle | 236/78 |

(List continued on next page.)

FOREIGN PATENT DOCUMENTS

| | | |
|---|---|---|
| 0045942 | 2/1982 | European Pat. Off. . |
| 0116267 | 8/1984 | European Pat. Off. . |
| 0466633 | 1/1992 | European Pat. Off. . |
| 0137547 | 9/1979 | Germany . |
| 4436445 | 4/1996 | Germany . |
| 7214416 | 8/1995 | Japan . |
| 8174379 | 7/1996 | Japan . |

OTHER PUBLICATIONS

Smith, S. et al., "Update on High–Speed Milling Dynamics," ASME—PED, Winter Annual Meeting, Intelligent & Integrated Manufacturing Analysis & Synthesis, Ed. Liv et al., 1987, vol. 25, p. 153–165.

Hernandez, I. et al., "Unmanned Machining, High–Speed, High–Power Milling," Manufacturing Processes, Systems & Machines, 14th Conference on Production Research & Technology, Ed. S. K. Samanta, Ann Arbor, Michigan, Oct. 6–9, 1987, pp. 35–41.

Tlusty, J. et al., "High Speed High Power Milling," Advances in Manufacturing Systems Integration & Processes, 15th Conference on Production Research & Technology, Pub. SME, Ed. Prof. David A. Dornfeld, Berkeley, California, Jan. 9–13, 1989, pp. 215–222.

Tlusty, J., "Milling Performance Tests of the Scharmann Ecocut Horizontal Boring and Milling Machine," University of Florida, Jun. 1986.

TBM Inc. et al., SETCO Proposal, "Highly Stable, High Speed, High Power (HS/HSHP) Spindle Head," Cincinnati, Ohio, Dec. 20, 1988.

Delio, T. S., "A Sensor–Based Adaptive Control Restraint System for Automatic Spindle Speed Regulation to Obtain Highly Stable Milling," A Dissertation, University of Florida, 1989.

International Search Report for International Application No. PCT/US98/18891, dated Jan. 12, 1999.

*See United States Patent No. 4,413,507.

*Primary Examiner*—William Grant
*Assistant Examiner*—Iván Calcaño
*Attorney, Agent, or Firm*—John J. Prizzi

[57] ABSTRACT

A hand-held, portable device recommends dynamically preferred speeds for stabilizing or reducing undesirable vibration such as chatter in a machining process. The device may be applied to machining processes such as turning, boring, milling and drilling which exhibit a relative rotational motion between the cutting tool and workpiece. The device measures in a safe, non-contact manner via a microphone the dominant audio signal component of the sound pressure emanating from the machining processes. Without prior knowledge of the machining process parameters or the dynamic characteristics of the machine tool or workpiece, the audio signal is conditioned and processed to determine the frequency component levels. The rotational speeds which are more likely to lead to a stable machining process are calculated based on the number of teeth on the cutting tool and the identified dominant frequency of vibration. The dynamically preferred speeds are displayed as recommendations to the process operator or machinist.

25 Claims, 6 Drawing Sheets

U.S. PATENT DOCUMENTS

| | | | |
|---|---|---|---|
| 3,605,029 | 9/1971 | Freedman | 328/167 |
| 3,614,484 | 10/1971 | Shoh | 310/8.2 |
| 3,619,671 | 11/1971 | Shoh | 310/8.2 |
| 3,774,730 | 11/1973 | Maddux | 188/1 B |
| 3,798,626 | 3/1974 | Weichbrodt et al. | 340/669 |
| 4,072,842 | 2/1978 | Ullmann et al. | 318/147 |
| 4,176,396 | 11/1979 | Howatt | 702/34 |
| 4,413,507 | 11/1983 | Drew et al. | 73/104 |
| 4,456,960 | 6/1984 | Wakai | 364/474 |
| 4,558,311 | 12/1985 | Forsgren et al. | 340/680 |
| 4,559,600 | 12/1985 | Rao | 364/474 |
| 4,604,834 | 8/1986 | Thompson | 51/165.71 |
| 4,636,780 | 1/1987 | Thomas et al. | 340/680 |
| 4,709,198 | 11/1987 | Ogo et al. | 364/474 |
| 4,713,770 | 12/1987 | Hayes et al. | 700/175 |
| 4,736,625 | 4/1988 | Patterson et al. | 73/104 |
| 4,809,200 | 2/1989 | Moore et al. | 702/176 |
| 4,831,365 | 5/1989 | Thomas et al. | 340/680 |
| 4,853,680 | 8/1989 | Thomas | 340/680 |
| 5,070,655 | 12/1991 | Aggarwal | 51/165.71 |
| 5,170,358 | 12/1992 | Delio | 700/177 |
| 5,518,347 | 5/1996 | Cobb, Jr. | 409/191 |
| 5,903,855 | 5/1999 | Kiyota | 702/86 |
| 5,905,440 | 5/1999 | Julian et al. | 340/680 |
| 5,907,491 | 5/1999 | Canada et al. | 364/468.15 |
| 5,912,821 | 6/1999 | Kobayashi | 364/528.15 |
| 5,983,165 | 11/1999 | Minnich et al. | 702/56 |
| 6,029,098 | 2/2000 | Serizawa et al. | 700/188 |

DEVICE AND METHOD FOR RECOMMENDING DYNAMICALLY PREFERRED SPEEDS FOR MACHINING

BACKGROUND OF THE INVENTION

1. Field of the Invention

This invention relates to an electronic device which measures sound emanating from a machining process and displays preferred rotational speed recommendations to eliminate or reduce undesirable vibration known as chatter. More particularly, the device is applicable to machining operations which exhibit a relative rotation between a tool having one or more cutting teeth and a workpiece. This device provides a safe means for the operator to interactively measure and determine the recommended speeds without prior knowledge or modification of the machine tool and workpiece.

2. Description of the Prior Art

Machining processes such as turning, boring, milling and drilling are often limited by undesirable vibration in the form of chatter. The chatter is a result of an unstable machining process caused by the relative vibratory motion between the cutting tool and workpiece. This common problem in industry reduces the quality of the machined surface, limits the productivity of the machining process and often reduces the life of the cutting teeth or results in tool failure. Many approaches are used to stabilize the machining process and avoid chatter. One approach is to maximize the stability of the process through the selection a priori of the machine tool, the material of the tool and workpiece fixturing and other components which provide more desirable dynamic stiffness and damping characteristics. In these ways the stability of the machining process is increased by design, although the continuous drive for greater productivity and manufacturing flexibility inevitably pushes many machining operations to chatter.

With the continued rapid development of tool materials, cutting edge coatings and increased machine tool capabilities, the range of potential rotational speeds has widened significantly. Extensive trial and error optimization of the machining process parameters of speed, feed rate and depth of cut are often additionally required at process setup and specification or to solve a problematic condition during production. Other approaches, such as sophisticated methods and implementation means of active process monitoring, chatter detection and automatic control of instability and vibration in machining operations, have been attempted.

The efforts of most of these techniques have been unsatisfactory for a variety of reasons, including limited application to specific machining operations, conditions or tooling; modification of machinery controls and drives; numerous sensor types and integration; extensive prior knowledge required of the dynamic characteristics of the machine tool, workpiece or process program and machining limits. Automated systems additionally require frequent calibration of the sensors and associated operator training or require controlling parameters to remain within other limiting thresholds each time the tool, part program or process parameters are modified.

U.S. Pat. No. 5,170,358, to Delio, teaches a method of controlling chatter in a machine tool by analyzing vibration signals from a machining operation and actively monitoring and controlling the feed of the cutting tool or the speed of rotation. The method taught by Delio requires a direct interconnection to the machine tool for control. Such an arrangement is fairly complex and may require altering the software of a preprogrammed machine tool controller.

In order to overcome the various limitations of prior art systems, it is the object of the present invention to provide a simplified means of measuring machining process behavior and establishing rotational speed recommendations which are likely to result in more stable machining.

It is another object to provide a device which measures the process through a safe, non-contact means requiring no modification or integration with the machine tool.

It is yet another object of the present invention to provide recommended rotational speeds without prior knowledge of the dynamics of the machine tool, workpiece or the process program and parameters.

Another object is to provide a portable, hand-held device which may be readily applied to numerous machining processes and machine tools without interruption of the machining operation.

It is yet another object of the present invention to provide dynamically preferred speed alternatives for machining operations which exhibit relative rotation between a tool with cutting teeth and a workpiece. The object of the device is to provide specific speed recommendations to be evaluated by the operator for their suitability for the measured machining process while tool balance, speed limitations, safe machine operation and machining practice are considered.

SUMMARY OF THE INVENTION

To achieve these and other objects which will become apparent to those skilled in the art, the present invention comprises a device which employs a microphone sensor to measure audible sound emitted from the cutting tool/workpiece interface during a machining process, a gain control and filter means to condition the sensed vibration signal, a means for processing the signal to determine the dominant frequency component of the signal, a user indicated tooth count specifying the number of cutting edges on the tool and display of calculated speed recommendations whereby chatter free machining may be achieved.

DETAILED DESCRIPTION OF THE EMBODIMENTS

Figure 1:
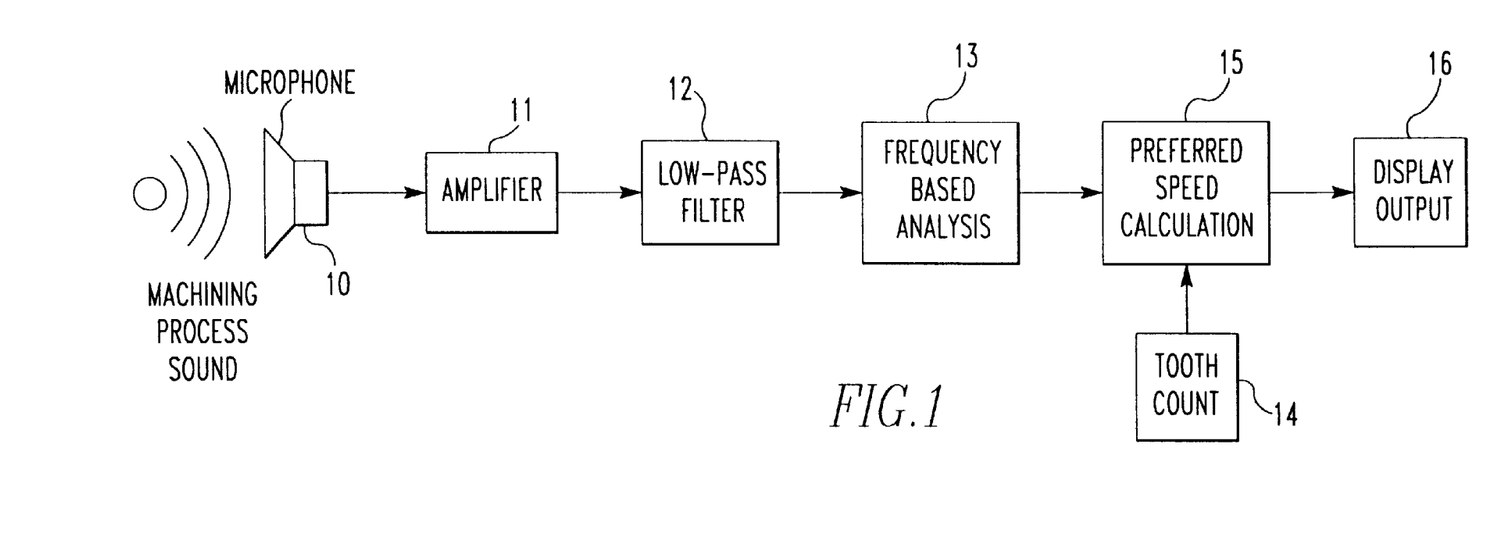
FIG. 1 is a schematic diagram illustrating the functional flow of the device.

Referring to FIG. 1, the functional flow of the present invention is depicted. A single audio sensor comprising a microphone 10 capable of detecting sound pressure emanating from the machining process produces a raw data signal. A stepped gain amplifier 11 and low pass filter 12 condition the signal to provide enhanced signal-to-noise characteristics and avoid aliasing if a digital representation of the signal is employed. The signal frequency component with the greatest magnitude is established from a frequency based analysis 13. The dominant frequency may be determined using analog approaches, including but not limited to a frequency counter, frequency-to-voltage converter or moving filter techniques. The conditioned signal may be digitally represented and digital signal processing techniques such as fast Fourier, fast Hartley or other transforms which yield coefficients indicating spectral components may be employed. Based on the identified frequency of the dominant signal component and the tooth count 14 which specifies an integer number of edges on the cutting tool, a fixed algorithm 15 calculates the dynamically preferred speed recommendations which are displayed 16. The speeds indicated in revolutions per minute correspond to favorable cutting edge phasing with the measured process vibration and may result in the reduction or elimination of chatter. The preferred speeds are calculated based on the measured process dynamics without prior knowledge of the tool, workpiece or machine tool; therefore, the displayed speed recommendations must be evaluated for suitability to the application.

Figure 2:
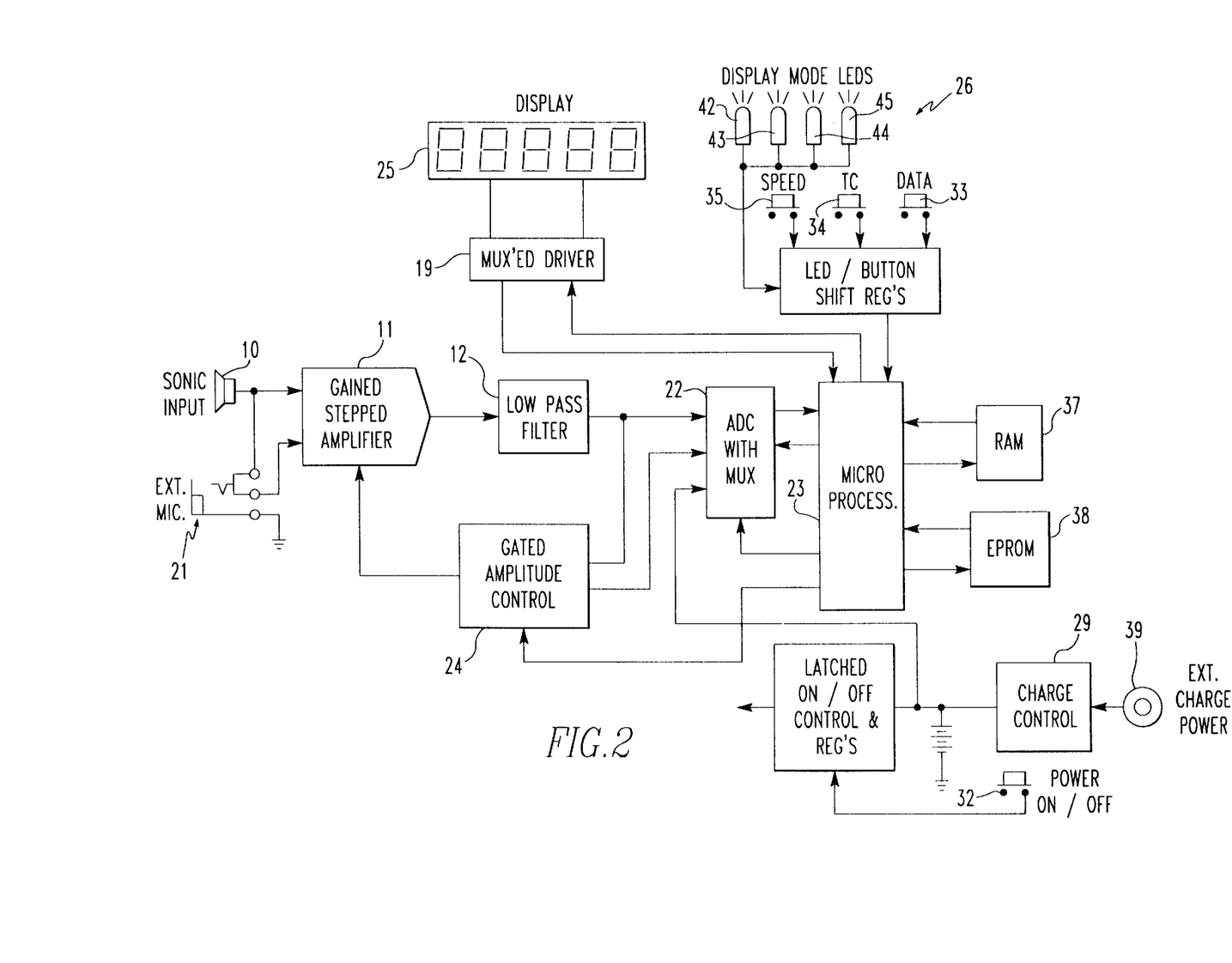
FIG. 2 is a block diagram of a digital embodiment of the invention.

Referring to FIG. 2, the preferred embodiment of the present invention is illustrated as a means for measuring the machining process sonic characteristics and displaying the dynamically preferred speed recommendations. A transducer for sensing vibration, such as an acoustic microphone 10, is internally mounted in a conical chamber 31 (FIG. 3) or optionally an external, remote microphone transducer measures the sound emitted from the machining process producing an analog input signal to the disclosed device. Insertion of the external microphone plug into the external microphone jack 21 causes the internal microphone 10 to be disabled. The input signal is conditioned by a gain stepped amplifier 11 and low-pass filter 12. The filter output is sampled by an analog-to-digital converter 22 (ADC). The input analog signal is amplified by a controlled amount via a gated amplitude control circuit 24 to utilize the full scale dynamic range of the ADC 22. Based on two data sets acquired with a high frequency sampling rate at 10,000 Hz and one data set acquired with a low frequency sampling rate at 3,000 Hz, the sampling rate and low-pass filter cutoff are modified. The digital signal is transformed from the time domain to a frequency domain yielding the magnitude of spectral components. The signal transform is achieved using any mathematical technique such as a fast Fourier or fast Hartley transform. Window functions which cause the digital signal data to smoothly approach zero at the limits of its range are employed to reduce spectral leakage and spectrum smoothing simplifies the identification of the dominant frequency. The user enters the number of cutting edges on the tool which is operating when the machining process sound is measured as the tooth count 14. Based on the dominant frequency identified and the tooth count 14, the dynamically preferred speed recommendations are calculated in the microprocessor 23 and digitally displayed via a multiplexed display driver 19. A common numerical display 25 is used for all device output. The mode of operation and display is set by user buttons. The corresponding display mode is indicated by the mode LEDs 26 which accompany the buttons. The device control and program algorithm are stored in an EPROM 38 and the microprocessor employs external RAM 37. The system power is stored in an internal, rechargeable battery pack. The external charge power is supplied to the DC charger jack 39. A charge-state control circuit 29 determines the charge level and prevents overcharging the battery. To conserve battery life, a watchdog timer in the microprocessor provides automatic shutoff if the device remains unchanged for a specified period of time.

Figure 3:
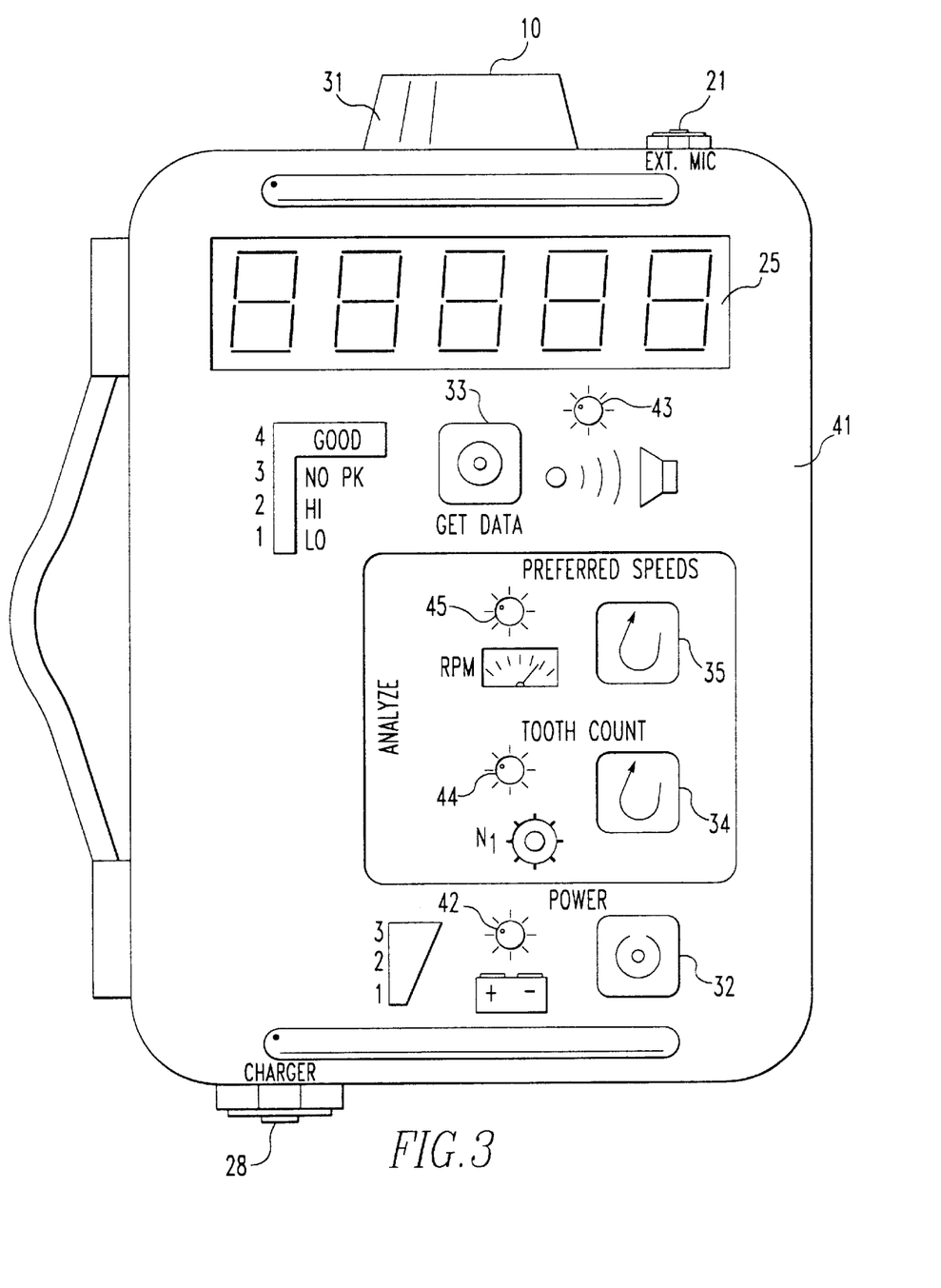
FIG. 3 depicts a sample user interface of the invention.

FIG. 3 depicts a sample user interface design for human factors. The front panel consists of a laminated contact (overlay) surface 41 or similar surface sealed for use in an industrial environment. The device design provides an uncomplicated, sequential operational process. The device operation consists of a four-step process.

1) First Step: The POWER button 32 is depressed to activate the device. The POWER button is a single push button which has alternate on/off action. An adjacent LED 42 illuminates to indicate that the POWER button has been pressed and that the numerical display 25 is currently indicating the battery charge condition. The internal battery charge level is measured and indicated by a 1, 2 or 3 on the digital display. After several minutes of non-use, the device automatically shuts off to conserve battery power.

2) Second Step: The user directs the acoustic microphone 10 at the machining process which is exhibiting undesirable vibration in the form of chatter. The GET DATA 33 button is pressed to initiate the data acquisition process. The corresponding LED 43 illuminates and the center segments of the numeric display are sequentially activated to provide visual feedback while the sound data characteristics are measured and initially assessed. The microprocessor program establishes suitability of the data condition and the numeric display 25 indicates a "1" for low signal amplitude indicating insufficient signal/noise content; a "2" for high signal amplitude indicating the signal voltage has been limited to avoid saturation of electronic components; a "3" for indicating that no dominant spectral component could be identified; or a "4" for good data indicating the characteristics of the acquired sound signal are sufficient to continue analysis.

3) Third Step: The user presses the TOOTH COUNT button 34. The adjacent LED 44 illuminates signifying that the numerical display corresponds to the number of edges on the cutting tool. The tooth count 14 is initially set to "0" and may be incrementally advanced by repeatedly pressing the TOOTH COUNT button 34. The numeric display 25 sequences from 1 to 16, or other programmed maximum value and then rolls over again, beginning at "1". With the correct tooth count 14 displayed the user continues. Pressing any other mode button, except the POWER button 32, results in the storage of the tooth count 14 for future use.

4) Fourth Step: The operator presses PREFERRED SPEEDS button 35 to list sequentially up to ten, or other programmed maximum, dynamically preferred speed recommendations in revolutions per minute (RPM). The highest speed is indicated first and slower speed options are consecutively displayed until the list rolls over to the highest speed again. As before, the adjacent LED 45 indicates that the numeric display 25 now shows speeds in RPM. The user may change the tooth count 14 to investigate other preferred speeds corresponding to the different number of edges in the cutting tool.

Following the measurement of the machining process sound and the display of the preferred speeds, the operator must assess the suitability of the speed recommendations for the machining application. As with all process parameter specification, consideration of the cutting edge and workpiece materials, the resulting machining surface rate, the maximum speed limitation of the machine tool and cutting tool, the balance of the workpiece of cutting tool and general safety concerns must be considered prior to employing any of the recommended speeds.

Figure 4A:
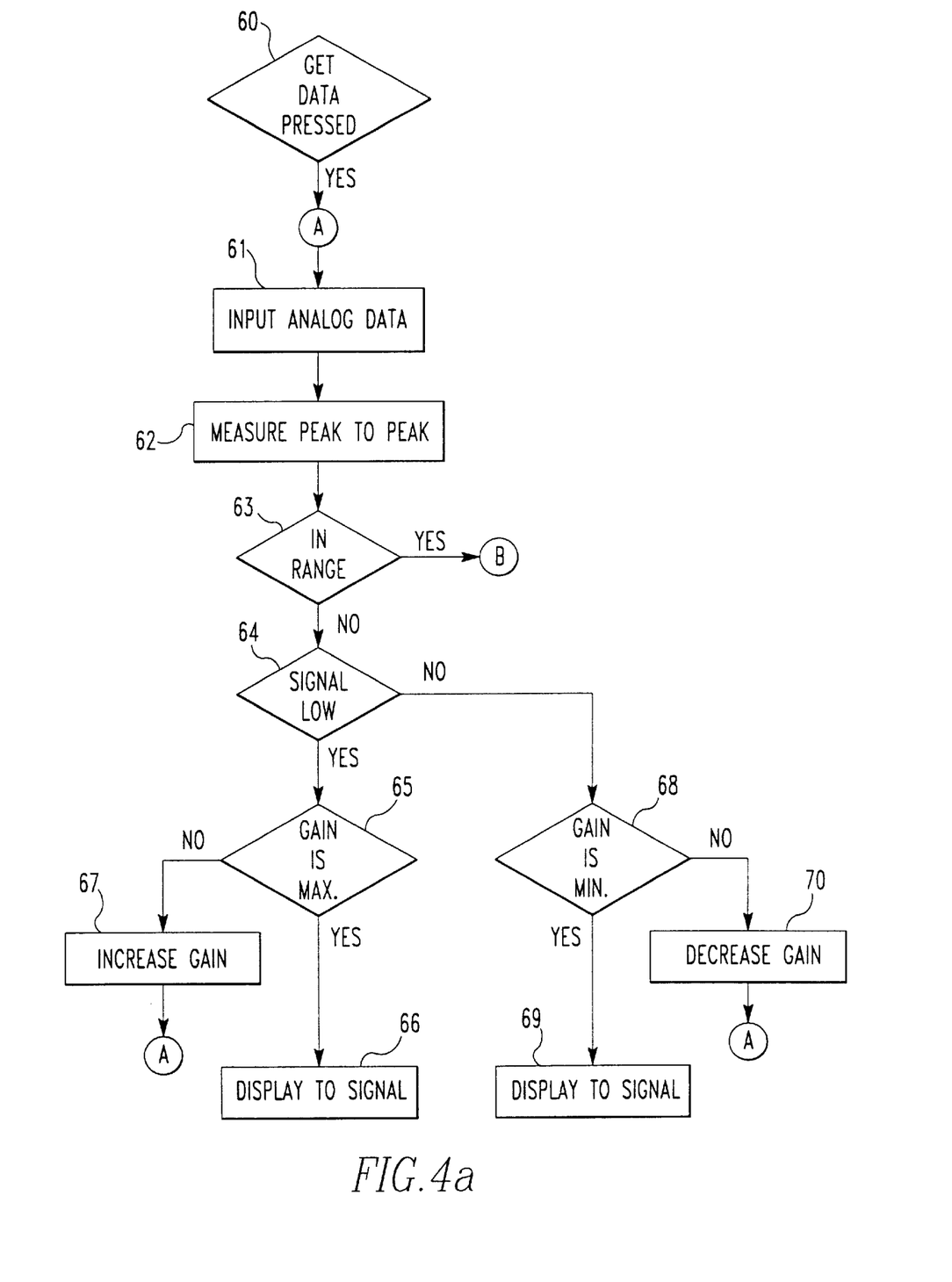
FIGS. 4a, 4b and 4c are flow diagrams used to describe the program stored in the EPROM for identifying the chatter frequency and for calculating preferred speed recommendations.
Figure 4B:
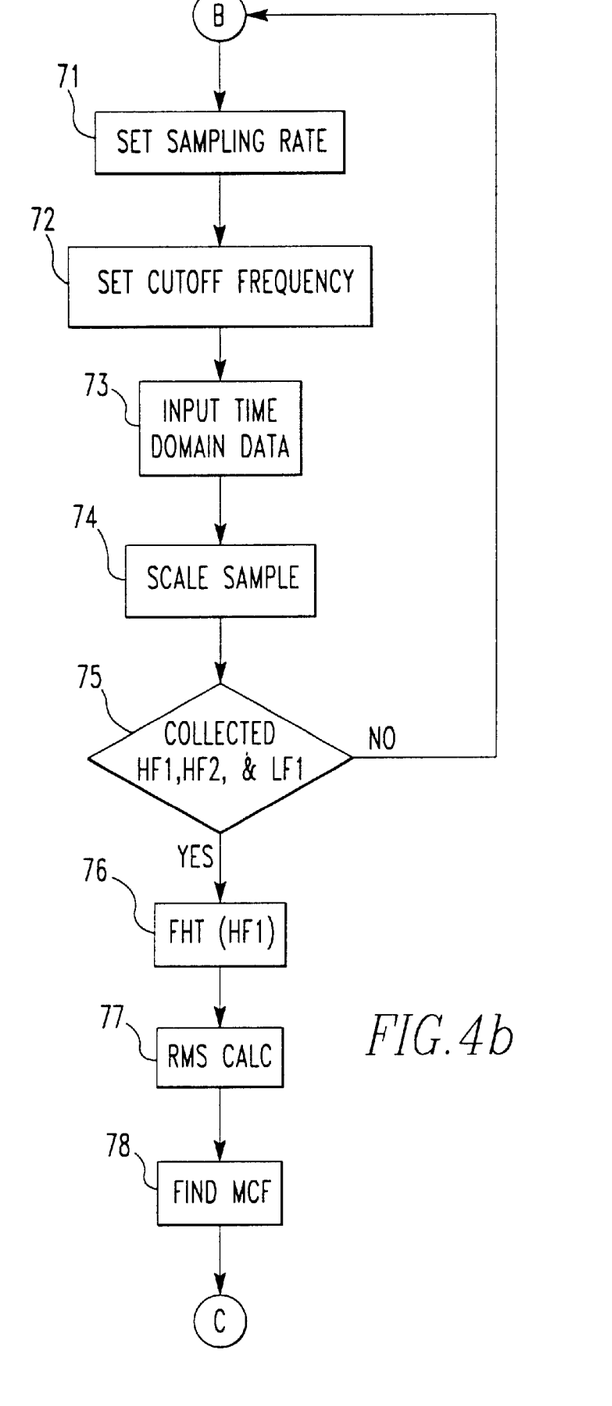
Figure 4C:
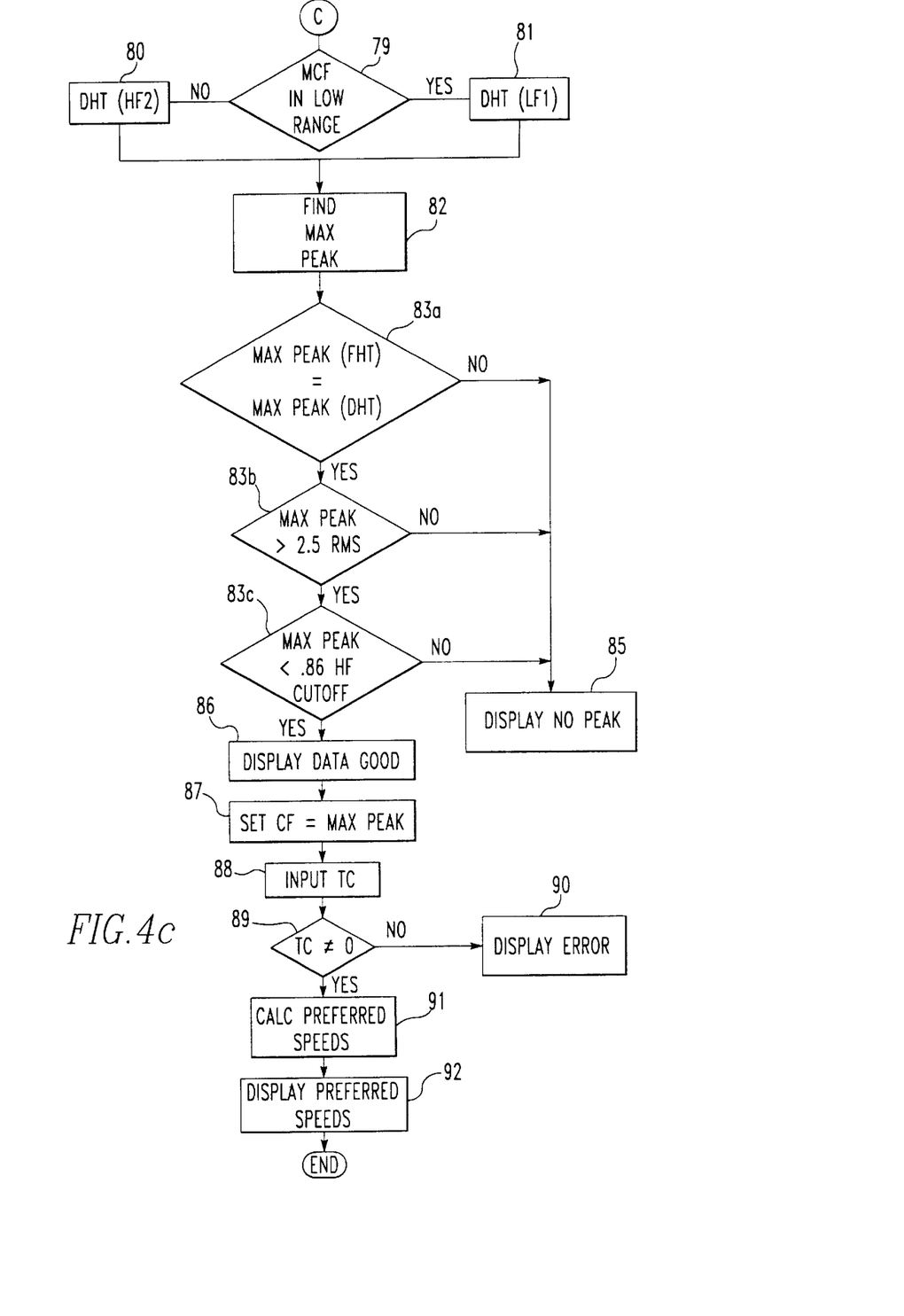

In the preferred embodiment disclosed herein, the microprocessor 23 executes a program that is stored in the EPROM 38. FIGS. 4a, 4b and 4c are schematic flow diagrams describing a suitable program.

Referring to FIG. 4a, the program begins when the GET DATA button 33 is pressed. When the GET DATA button is pressed, the LED 43 is illuminated and analog vibration or sound data input is commanded at 61 and the peak-to-peak amplitude is measured at 62. If the peak-to-peak amplitude tested at 63 is in an acceptable range that does not saturate the analog to digital converter and uses substantially the entire output range of the analog to digital converter, control passes to B on FIG. 4b. If the data is not in range and it is low (as determined at 64) and the gain of the stepped amplifier is at maximum amplification (determined at 65), then "1" is displayed at 66 indicating a low signal amplitude. If the stepped gain amplifier is not at maximum amplification the gain is increased at 67 until the gain is within the acceptable range. If the peak-to-peak signal saturates the analog to digital converter 22 and the gain is the minimum (determined at 68), then "2" is displayed at 69, indicating a high signal amplitude. If the gain of the stepped gain amplifier is not minimum it is reduced at 70 until the peak-to-peak amplitude is in an acceptable range.

The gain control procedures described with reference to FIG. 4a are an essential feature of this invention. The amplitude of a chatter signal will vary from machine to machine and from workpiece to workpiece and with the location of the vibration sensor or microphone. The procedures described automatically adjust the gain to get the largest possible range of peak-to-peak values for the input signal to the analog to digital converter. This improves the likelihood of correctly identifying the chatter frequency. According to a preferred embodiment, the gain range is 40 dB.

Referring now to FIG. 4b, once the peak-to-peak analog signal level has been brought into acceptable range, the gain and filter are held constant and the digital sampling of the signal is begun. First the sampling rate is set at 71 and a corresponding low pass cutoff frequency is set at 72. In the inventor's experience, chatter frequencies are almost always less than 5000 Hz and most of the time are below 1500 Hz. Thus, the low pass frequency is first set at 5000 Hz and the sampling rate at 10,000 Hz (twice the highest likely chatter frequency to satisfy the well-known sampling criterion). Two sample sets are then digitized to produce digitized samples HF1 and HF2 (at 73, 74 and 75). The low pass frequency is set to 1500 Hz and the sampling rate is set to 3000 Hz to input digitized sample LF1 (at 73, 74 and 75). Each sample is scaled with a Hanning window coefficient and stored in a data array in RAM 37.

Next, a zero centered Fast Hartley transform is performed on data set HF1 to convert the data from the time domain to the frequency domain (a scaled magnitude spectrum) at 76. From the frequency domain data the root mean square (RMS) value of the amplitudes of the frequency peaks is calculated and saved at 77. Next, the maximum spectral component frequency (MCF) is identified in the spectrum as the likely chatter frequency at 78.

Referring to FIG. 4c, if the MCF in a low range (less than 1200 Hz), tested at 79, is identified, the program next performs an eight point Discrete Hartley transform centered on the MCF on data set LF1 at 81. The Discrete Hartley transform provides a high resolution frequency spectrum without the computational overhead of an entire Fast Hartley transform. If the MCF is in the high range (above 1200 Hz) then an eight point Discrete Hartley transform is performed on data set HF2 at 80.

The frequency spectrum generated at 80 or 81 is then examined at 82 to identify the magnitude and frequency of the maximum peak (Max Peak).

At 83a the maximum peak identified by the Discrete Hartley transform must occur in a frequency area and with an approximate magnitude corresponding to the maximum peak identified by the Fast Hartley transform on data set HF1. This comparison provides an effective means of evaluating data to reject random noise by determining whether or not there is persistent excitation at the MCF during data acquisition.

At 83b the magnitude of the Max Peak is compared to 2.5 times the RMS value. If it is less than 2.5 times the RMS value it is rejected. Thus, if the MCF was the result of a spurious noise in the sample HF1 not present in samples HF2 or LF1, the Max Peak will not be equated to the chatter frequency. The Max Peak frequency is compared at 83c to 0.86 times the low pass cutoff frequency for the high frequency sampling (4300 Hz). If Max Peak is greater, it is rejected as it might be an alias resulting from an insufficient sampling rate and effects of non-ideal low pass filtering.

If Max Peak is rejected at any of 83a, 83b or 83c, the "3" message is displayed at 85 indicating a no peak condition. If Max Peak is not rejected the "4" message is displayed at 86 indicating a good data condition. Also the chatter frequency (CF) is set to the frequency of Max Peak at 87.

Now the tooth count may be input at 88. When the tooth count has been entered by pressing the TOOTH COUNT button 34 repeatedly until the correct tooth count is displayed and another mode button is depressed, the tooth count is assigned to TC at 88. If the tooth count is not zero the preferred speeds calculation is made at 91. The calculation could be made with the following formula:

$$RPM_n = \frac{(60*CF)}{(TC*n)}$$

where integer values between 1 and 10 are assigned to n.

The preferred speeds are then displayed at 92. Each of the preferred speeds starting from the most preferred may be displayed by depressing PREFERRED SPEEDS button 35. If the data is not good at 89 and tooth count is not equal to zero, then a corresponding error code/message is displayed at 90.

The hand held device described herein can be used without interruption of the machining process or connection with the machine tool or controller. No prior knowledge is required of a) the dynamic characteristics of the machine tool, workpiece or related equipment, b) the tool path or process program, c) the specified machining parameters such as depth of cut or feed rate, or d) the nature of the cutting tool or workpiece material.

This device and the associated method may be applied to machining operations in which the toolholder is rotating and the workpiece is stationary or in which the toolholder is stationary and the workpiece is rotating.

While the preferred embodiment and general operation of the invention have been described in order to fully describe its principles, it is to be understood by those skilled in the art that the modifications and alterations in form and details may be made without departing from the spirit and scope of the invention.

What is claimed is:

1. A device which independent of machine tool parameters provides rotational speed recommendations for relative rotation between a cutting tool having at least one cutting edge and a workpiece whereby such speeds are likely to result in the reduction or elimination of chatter comprising:

(a) a transducer for sensing vibrations including the chatter between the cutting tool and workpiece and providing an electronic signal corresponding thereto;

(b) means for conditioning the signal to optimize the amplitude and attenuate unwanted frequency components;

(c) means for processing the conditioned signal to determine the frequency of the dominant spectral component;

(d) means for inputting the number of cutting edges on the cutting tool;

(e) computing means to calculate rotational speed recommendations as a function of the frequency of the dominant spectral component and the number of cutting edges; and (f) means for displaying the rotational speed recommendations.

2. The device according to claim 1, wherein the transducer is physically separate from the cutting tool, workpiece and machine tool and is used for detecting sound pressure within the audible range emanating from the machining process and indirectly measuring the relative vibration between the cutting tool and workpiece.

3. The device according to claim 2, wherein the transducer has a dynamic range of at least 12 kHz.

4. The device according to claim 2, wherein the transducer is fixed to the device.

5. The device according to claim 2, wherein the transducer is externally located from the device.

6. The device according to claim 2, wherein the transducer is an audio microphone.

7. The device according to claim 1 further comprising means for automatically setting internal signal filter ranges and gain amplification without user assistance or knowledge.

8. The device according to claim 7 further comprising means for displaying whether the amplitude of the conditioned signal is too high or too low for proper digitizing after the available gain adjustments.

9. The device according to claim 1, wherein the device further includes a rechargeable battery as its power source, a control means to prevent overcharging, a charge state indicator and an automatic shutoff to prevent battery drain.

10. The device according to claim 1 further comprising means for digitizing the conditioned signal.

11. The device according to claim 10 wherein at least two sets of samples of the conditioned signal are transformed to frequency domain spectrums and comparison is made to select a dominant spectral component indicative of the chatter frequency.

12. The device according to claim 11 wherein the root mean square value of the spectral components of one frequency domain spectrum is calculated and spectral components that do not exceed 2.5 times the root mean square value are rejected as the potential chatter frequency.

13. The device according to claim 10, wherein multiple sampling rates and corresponding multiple low pass cutoff frequencies can be selected for the means for digitizing the conditioned signal.

14. The device according to claim 10, wherein the data sampling rate of the means for digitizing is automatically set without user assistance or knowledge.

15. The device according to claim 1, wherein the means for processing the conditioned signal comprises means for digitizing a sample of the conditioned signal and means for performing upon the signal a fast transform from the time domain to the frequency domain to produce a spectrum including the dominant spectral component.

16. A device according to claim 1, wherein the transducer is physically separate from the cutting tool, workpiece and machine tool and is used for detecting sound pressure emanating from the machining process and directly measuring the relative vibration between the cutting tool and workpiece.

17. The device according to claim 1, wherein the transducer is used for detecting sound pressure within the audible range emanating from the machining process and indirectly measuring the relative vibration between the cutting tool and workpiece.

18. A method for determining rotational speed recommendations for relative rotation between a cutting tool having at least one cutting edge and a workpiece whereby such speeds are likely to result in the reduction or elimination of chatter and whereby such speeds are determined independent of machine tool parameters comprising the steps of:

(a) sensing vibrations including the chatter between the cutting tool and workpiece and providing an electronic signal corresponding thereto;

(b) conditioning the signal to optimize the amplitude and attenuate unwanted frequency components;

(c) processing the conditioned signal to determine the frequency of the dominant spectral component;

(d) inputting the number of cutting edges on the cutting tool;

(e) calculating rotational speed recommendations as a function of the frequency of the dominant spectral component and the number of cutting edges; and (f) displaying the rotational speed recommendations.

19. The method according to claim 18 wherein the step of sensing vibration is comprised of detecting sound pressure within the audible range from a location physically separate from the cutting tool, workpiece and machine tool which is emanating from the machining process and indirectly measuring the relative vibration between the cutting tool and workpiece.

20. The method according to claim 18 further comprising the step of automatically setting internal signal filter ranges and gain amplification without user assistance or knowledge.

21. The method according to claim 18 further comprising the step of displaying whether the amplitude of the conditioned signal is too high or too low for proper digitizing after the available gain adjustments.

22. The method according to claim 18 further comprising the step of digitizing the conditioned signal.

23. The method according to claim 22 wherein at least two sets of samples of the conditioned signal are transformed to frequency domain spectrums and comparison is made to select a dominant spectral component indicative of the chatter frequency.

24. The method according to claim 23 wherein the root mean square value of the spectral components of one frequency domain spectrum is calculated and spectral components that do not exceed 2.5 times the root mean square value are rejected as the potential chatter frequency.

25. The method according to claim 18, wherein the step of processing the conditioned signal comprises digitizing a sample of the conditioned signal and performing upon the sample a fast transform from the time domain to the frequency domain to produce a spectrum including the dominant spectral component.

* * * * *